(12) United States Patent
Lowe et al.

(10) Patent No.: US 7,782,209 B2
(45) Date of Patent: Aug. 24, 2010

(54) DETECTION SIGNAL GENERATOR CIRCUIT FOR AN RFID READER

(75) Inventors: Peter R. Lowe, Peyton, CO (US); James D. Hoemann, Denver, CO (US)

(73) Assignee: Assa Abloy AB, Stockholm (SE)

( * ) Notice: Subject to any disclaimer, the term of this patent is extended or adjusted under 35 U.S.C. 154(b) by 1079 days.

(21) Appl. No.: 11/396,290

(22) Filed: Mar. 31, 2006

(65) Prior Publication Data

US 2007/0229273 A1 Oct. 4, 2007

(51) Int. Cl.
G08B 13/14 (2006.01)

(52) U.S. Cl. ............... 340/572.4; 340/572.7; 340/10.34

(58) Field of Classification Search ... 340/572.1–572.8, 340/10.34, 5.62, 10.33, 10.42
See application file for complete search history.

(56) References Cited

U.S. PATENT DOCUMENTS

| | | | |
|---|---|---|---|
| 3,859,624 A | 1/1975 | Kriofsky | |
| 4,471,343 A | 9/1984 | Lemelson | |
| 4,525,686 A | 6/1985 | Yokoyo | |
| 4,730,188 A | 3/1988 | Milheiser | |
| 4,752,776 A * | 6/1988 | Katzenstein | 340/10.42 |
| 5,347,263 A | 9/1994 | Carroll et al. | |
| 5,523,746 A | 6/1996 | Gallagher | |
| 5,541,574 A | 7/1996 | Lowe et al. | |
| 5,973,611 A | 10/1999 | Kulha et al. | |
| 6,340,932 B1 | 1/2002 | Rodgers | |
| 6,476,708 B1 * | 11/2002 | Johnson | 340/10.34 |
| 6,650,227 B1 * | 11/2003 | Bradin | 340/10.3 |
| 6,905,074 B2 * | 6/2005 | Charrat | 235/492 |
| 7,180,403 B2 * | 2/2007 | Quan | 340/10.3 |
| 7,245,222 B2 * | 7/2007 | Bierach | 340/572.4 |
| 7,439,862 B2 * | 10/2008 | Quan | 340/572.7 |
| 2005/0083180 A1 * | 4/2005 | Horwitz et al. | 340/10.4 |
| 2005/0258940 A1 | 11/2005 | Quan | |

FOREIGN PATENT DOCUMENTS

| | | |
|---|---|---|
| EP | 0783158 | 7/1997 |
| EP | 0899677 | 3/1999 |

(Continued)

OTHER PUBLICATIONS

Official Communication for European Patent Application No. 07251385.6, dated May 7, 2009.

(Continued)

*Primary Examiner*—Eric M Blount
(74) *Attorney, Agent, or Firm*—Sheridan Ross P.C.

(57) ABSTRACT

An RFID transponder detector is provided having a coupled oscillator system. Coupled first and second LC of the system produce a detection signal each time a combination of pulses is applied to the LC pairs. Application of the pulses is repeated periodically to produce a sequence for detection signals having two different first and second detection frequencies. Transmitting the sequence of detection signals results in corresponding first and second response signals having the first and second detection frequencies at the LC pairs. Values of a preselected detection parameter for the detection signals are compared to the values of the detection parameter for the response signals to determine if a transponder having a transponder resonant frequency corresponding to the first or second detection frequency is present in a proximal space of the transponder detector.

20 Claims, 5 Drawing Sheets

FOREIGN PATENT DOCUMENTS

| | | |
|---|---|---|
| EP | 1160583 | 12/2001 |
| EP | 1394720 | 3/2004 |
| EP | 1605391 | 12/2005 |
| GB | 2237427 | 5/1991 |
| GB | 2278631 B | 12/1993 |
| WO | WO-98/01837 | 1/1998 |
| WO | WO 00/42585 | 7/2000 |

OTHER PUBLICATIONS

Extended European Search Report issued for European Patent Application No. 07251385.6, dated Jul. 10, 2007.

Official Communication for European Patent Application No. 07251385.6, dated Oct. 20, 2009.

* cited by examiner

SYMMETRIC OSCILLATION MODE

ANTI-SYMMETRIC OSCILLATION MODE

SYMMETRIC OSCILLATION MODE

ANTI-SYMMETRIC OSCILLATION MODE

DETECTION SIGNAL GENERATOR CIRCUIT FOR AN RFID READER

TECHNICAL FIELD

The present invention relates generally to RFID systems and, more particularly, to the construction and operation of a detection signal generator circuit utilized within a reader of an RFID system.

BACKGROUND OF THE INVENTION

Radio frequency identification (RFID) systems typically include at least one reader and a plurality of transponders, which are commonly termed credentials, cards, tags, or the like. The transponder may be an active or passive radio frequency communication device which is directly attached to or embedded in an article to be identified or otherwise characterized by the reader. Alternatively, the transponder may be embedded in a portable substrate, such as a card, tag, or the like, carried by a person or an article to be identified or otherwise characterized by the reader. An active transponder is powered up by its own internal power supply, such as a battery, which provides the operating power for the transponder circuitry. In contrast, a passive transponder is characterized as being dependent on the reader for its power. The reader "excites" or powers up the passive transponder by transmitting excitation signals of a given frequency into the space surrounding the reader, which are received by the transponder and provide the operating power for the circuitry of the recipient transponder. The frequency of the excitation signals preferably corresponds to the frequency of data signals communicated between the transponder and reader.

Once a passive transponder is powered up, the transponder communicates information, such as identity data or other characterizing data stored in the memory of the transponder, to the reader. The transponder communicates with the reader in a contactless manner by generating transponder data signals utilizing internal circuitry which typically includes a resonant LC pair made up inter alia of a capacitor and an antenna. The transponder data signals are characterized by a specific carrier frequency which is a function of the transponder LC pair. In particular, the transponder LC pair is tuned to a desired resonant frequency so that the transponder data signals generated thereby have a carrier frequency corresponding to the tuned resonant frequency of the transponder LC pair.

For example, transponders of the type conventionally termed proximity cards or proximity tags have an LC pair tuned to a resonant frequency range of 100 to 150 kHz, which enables the proximity card to generate transponder data signals at a carrier frequency within this same range of 100 to 150 kHz. This carrier frequency range is nominally referred to herein as 125 kHz carrier frequency and is deemed a low frequency. In contrast, transponders of the type conventionally termed smart cards have an LC pair tuned to a higher resonant frequency of about 13.56 MHz, which enables the smart card to generate transponder data signals at the same carrier frequency of 13.56 MHz.

The transponder data signals are transmitted in the form of electromagnetic oscillations into the surrounding space in which the reader resides via the antenna of the transponder LC pair. The reader contains its own internal circuitry including an LC pair made up inter alia of a capacitor and an antenna which receives and "reads" the transponder data signals (i.e., extracts the data from the transponder data signals) when the reader LC pair is tuned to essentially the same resonant frequency as the tuned transponder LC pair and correspondingly to the carrier frequency of the transponder data signal.

The excitation signal generating and transmitting functions and the transponder data signal receiving and reading functions performed by the reader as described above define a reader operating state termed a "data transaction state." The data transaction state further encompasses reader data signal generating and transmitting functions, wherein information stored in the reader memory or otherwise generated by the reader is communicated to the transponder. The manner in which the reader communicates information to the transponder is essentially the same or similar to the manner in which the transponder communicates information to the reader. As such, the reader data signals are characterized by essentially the same carrier frequency as the transponder data signals.

Although a reader can continuously operate in the data transaction state, the functions performed by the reader while in the data transaction state typically have a relatively high power demand, which can rapidly deplete the power supply of the reader. This condition is particularly undesirable when the reader is powered by a self-contained portable power supply, such as a small disposable or rechargeable battery, which has a finite life. It is generally more power efficient to operate the reader in the data transaction state only when a transponder is within the read range of the reader, while operating the reader in an alternate state having a relatively lower power demand at all other times. A preferred alternate lower power reader operating state is termed a "detection state," which is commonly enabled by a ring signal generator circuit and a transponder detection circuit provided within the reader. The reader operates continuously in the detection state except when the transponder detection circuit detects a transponder within the read range of the reader. The reader switches to the data transaction state upon detection of a transponder, but only for a limited time sufficient to complete communication between the reader and transponder before switching back to the detection state.

U.S. Pat. No. 6,476,708 to Johnson (the '708 patent), which is incorporated herein by reference, discloses an exemplary reader having a low power detection state and a high power data transaction state of operation. The reader includes a signal generator circuit which alternately acts as the ring signal generator circuit or an excitation signal generator circuit depending on the operating state of the reader at any given time. The reader further includes a small portable battery power supply and the transponder detection circuit which is coupled to the signal generator circuit.

The operating principle of the detection state is to detect a transponder within the read range of the reader by measuring changes in an impulse response on the reader antenna. The detection state is initiated by generating a detection pulse using the signal generator circuit and applying the detection impulse to the reader antenna. The detection impulse causes the reader antenna to transmit a ring signal into the surrounding space, which has a frequency corresponding to the resonant frequency of the tuned LC pair of the reader. The resulting ring signal causes a predictable impulse response on the reader antenna. Although the ring signal has insufficient to power to operate any transponders residing in the surrounding space, if a transponder having a resonant frequency at or near the resonant frequency of the reader is sufficiently proximal to the reader, the impulse response on the reader antenna is altered in a characteristic manner. In particular, inductive coupling of the reader antenna to the nearby transponder antenna causes a change in the impulse response on the reader antenna.

The reader employs the transponder detection circuit to detect this change in the impulse response. In particular, the transponder detection circuit monitors the level of a designated transponder detection parameter of the impulse response. When the transponder detection parameter reaches a predetermined threshold level, the presence of a transponder in the surrounding space is confirmed and the transponder detection circuit switches the signal generator circuit from the low power detection state to the high power data transaction state thereby terminating generation of the ring signals. As such, the signal generator circuit transitions to an excitation signal generator circuit, wherein the signal generator circuit draws increased electrical current from the reader power supply to generate and transmit an excitation signal which is sufficient to activate the transponder. The excitation signal is received by the transponder and powers the transponder circuitry, which in turn generates a transponder data signal for transmission to the reader. After the reader reads the received transponder data signal, the signal generator circuit switches back to the detection state and resumes generation of the ring signals while terminating generation of the excitation signals.

Since only ring signals are transmitted by the reader in the detection state, the reader runs at a very low duty cycle, yet at a high repetition rate while in the detection state. Consequently, the above-described technique enables the reader to operate with very low average power consumption to avoid accelerated dissipation of the reader power supply while maintaining a rapid response time for transponder detection.

The sensitivity, and correspondingly the detection range, of the reader in the detection state is highly dependent on closely matching the tuned resonant frequencies of the reader and transponder LC pairs. However, the entire population of transponders in a given RFID system is not always tuned to the same single resonant frequency. Instead a given population of transponders may exhibit a distribution of multiple resonant frequencies. For example, different manufacturers of transponders can elect to tune their transponders to different nominal resonant frequencies resulting in commercially available transponders operating at different frequencies. Therefore, it is desirable to provide a transponder detector for a reader which is capable of detecting transponders tuned to different resonant frequencies.

Accordingly, it is generally an object of the present invention to provide a reader which can selectively generate detection signals on a single reader antenna with different detection signal frequencies. It is generally another object of the present invention to provide a reader which can utilize the different frequency detection signals in a searching pattern for transponders tuned to corresponding frequencies. It is another object of the present invention to provide a reader which generates different frequency detection signals while operating in a state of very low power consumption. More particularly, it is an object of the present invention to provide a reader which transitions between generation of the different frequency detection signals without excessive power consumption. It is a further object of the present invention to provide a reader having a detection circuit which maintains a high circuit Q in order to maintain sensitivity regardless of which detection frequency is generated. It is another object of the present invention to provide a reader having active circuits and switching elements for the detection state of operation which are implemented within an integrated circuit utilizing a standard process such as a digital or mixed signal CMOS integrated circuit. It is yet another object of the present invention to provide a detection signal generator circuit which can be readily integrated with an existing conventional low frequency or high frequency reader or reader/writer. These objects and others are accomplished in accordance with the invention described hereafter.

SUMMARY OF THE INVENTION

The present invention is an RFID transponder detector comprising a first LC pair, a second LC pair, an antenna, a controller and a detection and response signal measurement circuit. The first LC pair is coupled to the second LC pair, preferably across a coupling capacitor and the antenna is coupled to the first and second LC pairs. The first LC pair includes a first inductance coil and a first tuning capacitor and the second LC pair likewise includes a second inductance coil and a second tuning capacitor. The controller is coupled to the first and second LC pairs for applying first and second pulses to the first and second LC pairs. A first driver is preferably coupled between the first LC pair and the controller. As such, the controller applies the pulses to the first LC pair through the first driver. A second driver is similarly preferably coupled between the second LC pair and the controller so that the controller applies the pulses to the second LC pair through the second driver.

The first and second LC pairs resonate in response to the applied first and second pulses to produce a sequence of first and second detection signals. The first detection signal has a first detection frequency and the second detection signal has a second detection frequency different from the first detection frequency. Transmitting the sequence of detection signals from the antenna results in corresponding first and second response signals having the first and second detection frequencies, respectively, on the antenna.

The detection and response signal measurement circuit is coupled to the antenna and the controller. The detection and response signal measurement circuit receives the first and second detection signals and the corresponding first and second response signals and measures values of a preselected detection parameter for each of the detection signals and each of the response signals. The detection and response signal measurement circuit may, for example, be a means for measuring voltage or decay rate values of the detection and response signals. The controller or the detection and response signal measurement circuit is configured to compare the values for the detection signals to the values for the response signals and determine if a transponder having a transponder resonant frequency corresponding to the first or second detection frequency is present in a proximal space of the transponder detector based on comparison of the values.

In accordance with one embodiment, the RFID transponder detector further comprises a mode switch (preferably a mode logic gate) in communication with the controller. The controller is configured to direct transitioning of the mode switch between a first position and a second position. The first position determines a symmetric mode of oscillation of the first and second LC pairs and the second position determines an anti-symmetric mode of oscillation of the first and second LC pairs. The RFID transponder detector still further comprises an enable switch (preferably an enable logic gate) in communication with the controller. The controller is configured to direct transitioning of the enable switch between two positions. The two positions determine whether one of the detection signals or an excitation signal is applied on the antenna.

In accordance with another embodiment, the RFID transponder detector further comprises a third LC pair including a third inductance coil and a third tuning capacitor. The third LC pair is coupled to the controller for applying pulses to the third LC pair, which produce the sequence of detection signals transmitted by the antenna. The sequence of detection signals includes detection signals having at least three different frequencies, thereby defining a third detection frequency in addition to the first and second detection frequencies. The detection and response signal measurement circuit is coupled to the third LC pair for determining if a transponder having a transponder resonant frequency corresponding to the third detection frequency is present in the proximal space of the transponder detector.

In an alternate characterization, the present invention is a reader for an RFID system. The reader comprises an exciter/reader circuit, an antenna, a main controller, and a detection circuit. The detection circuit includes a first LC pair coupled to a second LC pair, preferably across a coupling capacitor. The antenna is coupled to the first and second LC pairs, which include first and second inductance coils and first and second tuning capacitors, respectively. The detection circuit has a detection circuit controller coupled to the first and second LC pairs for applying first and second pulses to the first and second LC pairs. The first and second LC pairs resonate in response to the applied first and second pulses to produce a sequence of first and second detection signals. The first detection signal has a first detection frequency and the second detection signal has a second detection frequency different from the first detection frequency. Transmitting the sequence of detection signals from the antenna results in corresponding first and second response signals having the first and second detection frequencies, respectively, on the antenna.

The detection circuit further includes a mode switch (preferably a mode logic gate) in communication with the detection circuit controller. The detection circuit controller is configured to direct transitioning of the mode switch between a first position and a second position. The first position determines a symmetric mode of oscillation of the first and second LC pairs and the second position determines an anti-symmetric mode of oscillation of the first and second LC pairs. The RFID transponder detector still further comprises an enable switch (preferably an enable logic gate) in communication with the controller. The controller is configured to direct transitioning of the enable switch between two positions. The two positions determine whether one of the detection signals or an excitation signal is applied on the antenna.

The detection circuit still further includes a detection and response signal measurement circuit is coupled to the antenna and the detection circuit controller. The detection and response signal measurement circuit receives the first and second detection signals and the corresponding first and second response signals and measures values of a preselected detection parameter for each of the detection signals and each of the response signals. The detection and response signal measurement circuit may, for example, be a means for measuring voltage or decay rate values of the detection and response signals. The detection circuit controller or the detection and response signal measurement circuit is configured to compare the values for the detection signals to the values for the response signals and determine if a transponder having a transponder resonant frequency corresponding to the first or second detection frequency is present in a proximal space of the transponder detector based on comparison of the values.

The exciter/reader circuit is coupled to the antenna and the main controller is coupled to the exciter/reader circuit and the detection circuit. The main controller is configured to activate the exciter/reader circuit in response to a transponder recognized signal from the detection circuit controller. In accordance with one embodiment, the antenna is integral with the first and/or second inductance coils. In accordance with another embodiment, the main controller is integral with the detection circuit controller.

In another characterization, the present invention is a transponder detection method. The method is initiated by applying first pulses to a first location and a second location on a coupled oscillator system having a first LC pair and a second LC pair. The first and second LC pairs are resonated in response to the first pulses to generate a first detection signal having a first detection frequency correlated to the first pulses. Second pulses are applied to the first and second locations on the coupled oscillator system. The first and second LC pairs are resonated in response to the second pulses to generate a second detection signal having a second detection frequency different than the first detection frequency and correlated to the second pulses. A sequence of the first and second detection signals are transmitted into a space proximal to said the and second LC pairs, which produces first and second response signals corresponding to the first and second detection signals, respectively.

Values of a preselected detection parameter for the first detection signal, the second detection signal, the first response signal, and the second response signal are measured to obtain a sequence of values of the detection parameter for the detection and response signals. Exemplary detection parameters include signal voltage or signal decay rate. An exemplary sequence of values is an alternating sequence. The value for the first detection signal is compared to the value for the first response signal and the value for the second detection signal is compared to the value for the second response signal. The sequence of values is preferably separated into a subsequence of values for the first detection signals, a subsequence of values for the second detection signals, a subsequence of values for the first response signals, and a subsequence of values for the second response signals before comparing the values for the detection signals to the values for the response signals. The presence of a transponder having a first transponder resonant frequency corresponding to the first detection frequency in a proximal space of the transponder detector is determined based on comparison of the values for the first detection and response signals. The presence of a transponder having a second transponder resonant frequency corresponding to the second detection frequency in the proximal space of the transponder detector is likewise determined based on comparison of the values for the second detection and response signals.

In accordance with one embodiment, the transponder detection method further comprises applying third pulses to the first and second locations and to a third location on the coupled oscillator system which additionally has a third LC pair. The first, second and third LC pairs are resonated in response to the third pulses to generate a third detection signal having a third detection frequency different than the first and second detection frequencies and correlated to the third pulses. A sequence of the first, second and third detection signals is transmitted into a space proximal to the first, second, and third LC pairs producing a third response signal corresponding to the third detection signal. Values of the detection parameter for the third detection and response signals are measured and the value for the third detection signal is compared to the value for the third response signal. The presence of a transponder having a third transponder resonant frequency corresponding to the third detection frequency in the proximal space of the transponder detector is determined based on comparison of the values for the third detection and response signals.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

Figure 1:
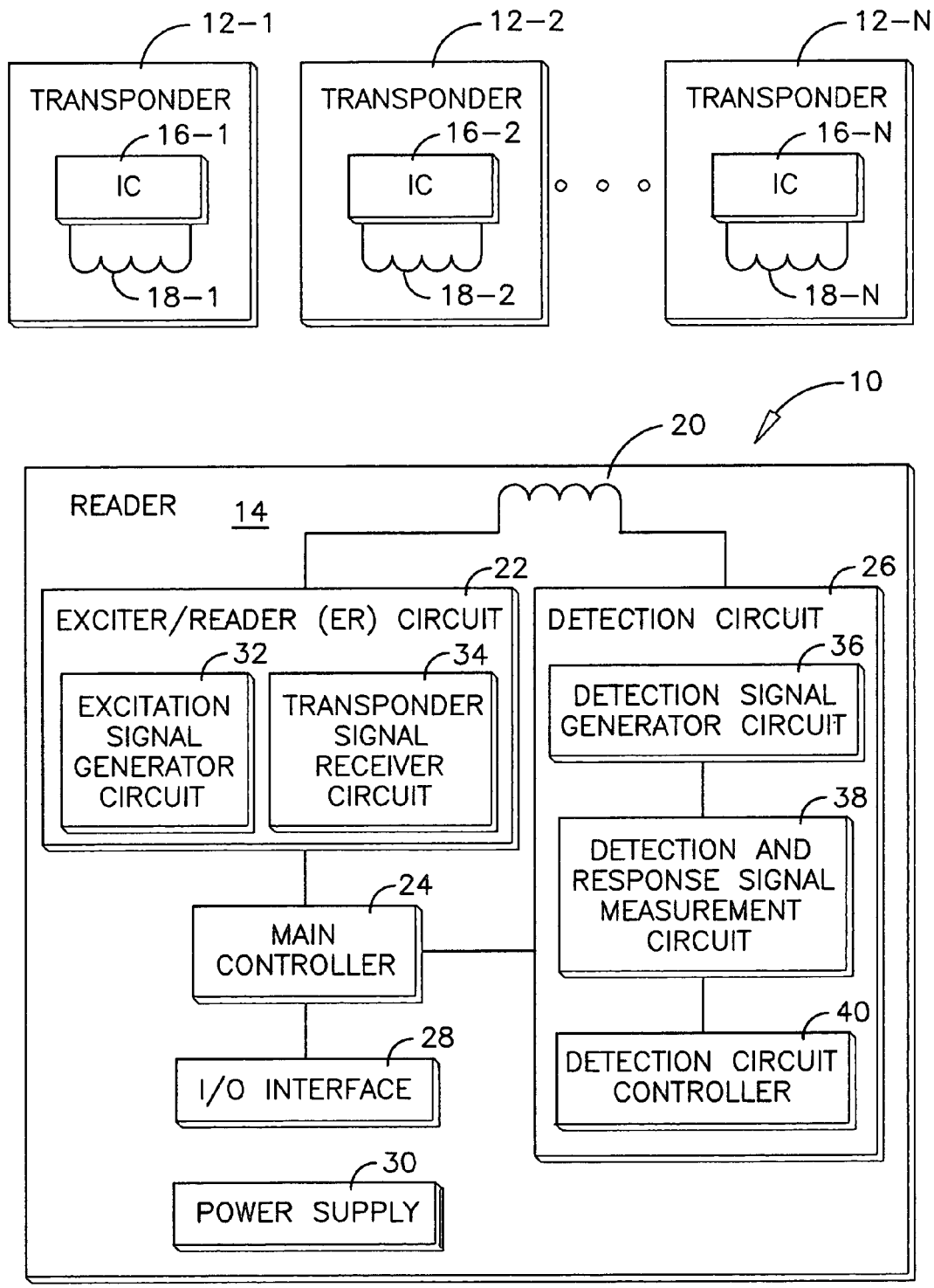
FIG. 1 is a block diagram of an RFID system having a detection circuit of the present invention.

Embodiments of the invention are illustrated by way of example and not by way of limitation in the above-recited figures of the drawings in which like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

An RFID system is shown in FIG. 1 and generally designated 10. The RFID system 10 comprises a plurality of transponders 12-1 through 12-N and a reader 14. The transponders 12-1 through 12-N are preferably passive transponders which do not require an internal power supply. Instead the electrical power required to operate the passive transponders is supplied to the transponders by electromagnetic energy transmitted from a reader. Accordingly, the passive transponders are operational when they receive electromagnetic oscillations from a reader, which are of a specific frequency and of a sufficient strength to power up the transponder.

Each transponder 12 comprises a number of functional elements including a transponder integrated circuit (IC) 16 and a transponder antenna 18. The transponder IC 16 embodies the processing and memory capabilities of the transponder 12. The transponder antenna 18 is coupled to the transponder IC 16 and is a conventional coil termed a "dual-function antenna coil" which performs both the receiving and transmitting functions of the transponder 12. Alternatively, two separate receiving and transmitting antenna coils (not shown) can be substituted for the single "dual function antenna coil" in the transponder 12. The transponder 12 also preferably includes an external transponder tuning capacitor (not shown) coupled to the transponder IC 16 and the transponder antenna 18. The term "external" is used above with respect to the transponder 12 to designate electronic components which are not physically or functionally included within the transponder IC 16. The transponder antenna 18, in cooperation with the transponder tuning capacitor, determines the tuned resonant frequency of the transponder LC pair and correspondingly the carrier frequency of the transponder 12.

The transponders 12 shown and described herein are but examples of types of transponders having utility in the RFID system 10. It is understood that practice of the present invention is not limited to any specific types of transponders, but is generally applicable to most conventional types of transponders having utility in RFID systems. Thus, for example, the transponders 12 can be selected from proximity cards, proximity tags, smart cards, or the like.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of the both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of both the transponder and reader. In the case of a portable reader and a portable transponder, the user may move both the portable reader and the portable transponder into relative proximity with one another to enable simultaneous operation of both the transponder and reader. Embodiments of the present invention are not limited to any one of the above-recited RFID system configurations.

The reader 14 comprises a number of functional elements including a reader antenna assembly 20, an exciter/reader (ER) circuit 22, a main controller 24, a detection circuit 26, an input/output (I/O) interface 28, and a power supply 30. The power supply 30 provides electrical operating power to the reader components in a controlled manner. In accordance with one embodiment, the power supply 30 is coupled to a finite electrical power source which is self-contained (i.e., internal) within the reader 14, such as a relatively small portable battery consisting of one or more disposable dry cells or rechargeable cells. Alternatively, the power supply 30 is hard wired to an essentially infinite remote electrical power source, such as an electric utility.

The ER circuit 22 comprises an excitation signal generator circuit 32 and a transponder signal receiver circuit 34. The excitation signal generator circuit 32 generally functions to generate an excitation signal which the reader antenna assembly 20 transmits in the form of electromagnetic oscillations into the open space of the external environment surrounding the reader 14. The excitation signals are received by a transponder 12 in the proximal space of the reader 14 (i.e., within a read range of the reader) to power up the transponder 12. Upon activation, the transponder IC 16 generates a transponder data signal, which contains readable information (i.e., transponder data) copied or otherwise derived from the memory of the transponder IC 16. The transponder data signal is transmitted into the open space of the external environment surrounding the transponder 12 via the transponder antenna 18. When a transponder data signal is received at the reader antenna assembly 20, the transponder signal receiver circuit 34 performs various operations on the transponder data signal to condition the signal, thereby producing a conditioned signal which is suitable for reading by the reader 14.

The conditioned signal containing the data from the transponder data signal is conveyed to the main controller 24, which processes the conditioned signal to extract the readable transponder data contained therein. In particular, the main controller 24 demodulates the conditioned signal in accordance with a respective modulation type according to firmware and/or software executed by the main controller 24. The extracted transponder data may be sent to an external device such as a central host computer (not shown) via the I/O interface 28.

As noted above, the excitation signal generator circuit 32 and the transponder signal receiver circuit 34 in combination are termed the ER circuit 22. The ER circuit 22 is a conventional circuit well known to the skilled artisan. Exemplary ER circuits having utility in the reader 14 are disclosed in U.S. Pat. Nos. 4,730,188 to Milheiser (the '188 patent), 5,541,574 to Lowe et al. (the '574 patent), and 5,347,263 to Carroll et al. (the '263 patent), all of which are incorporated herein by reference. Skilled artisans can further appreciate that the reader 14 can be adapted to include a conventional writer circuit (not shown) which is capable of writing programming instructions or other information to a transponder by either contact or contactless means. The ER circuit and writer circuit in combination are termed an exciter/reader/writer (ERW) circuit. The term "ER circuit" as used herein is deemed to be inclusive of ERW circuits.

The reader 14 comprises two states of operation, namely, a low power detection state and a high power data transaction state (alternately referred to as a "read state"), which has been described above. The low power detection state is the initial operating state of the reader 14, wherein the detection circuit 26 functions as a transponder detector to actively seek any transponders 12 residing in the surrounding space proximal to the reader 14. Since the ER circuit 22 and main controller 24 are characterized as having a high power demand when performing reader functions, the reader 14 is configured to deactivate most or all of the components and functions associated with the ER circuit 22 and the main controller 24 in the detection state. Substantial power savings are achieved by using the detection circuit 26 as the sole or primary operating unit for performing the transponder detection function in the detection state because the detection circuit 26 is characterized as having a low power demand. Once a transponder 12 is detected, the reader 14 switches to the high power data transaction state, but automatically switches back to the low power detection state when the high power data transaction state is completed.

The detection circuit 26 comprises a detection signal generator circuit 36 and a detection and response signal measurement circuit 38 coupled thereto. A detection circuit controller 40 is coupled to the detection signal generator circuit 36 and detection and response signal measurement circuit 38 to direct operation of the circuits 36, 38. In general, the detection and response signal measurement circuit 38 is configured to measure values of a preselected detection parameter for the detection and response signals to determine if any transponder 12 is present within the read range of the reader 14. Well known detection parameters include signal decay rate and signal voltage. If a transponder 12 is detected within the read range of the reader 14, the detection circuit controller 40 sends a transponder recognized signal to the main controller 24 indicating that a transponder 12 has been detected. The main controller 24 activates the ER circuit 22 in response to the transponder recognized signal, thereby switching the reader 14 from the low power detection state to the high power data transaction state.

Figure 2:
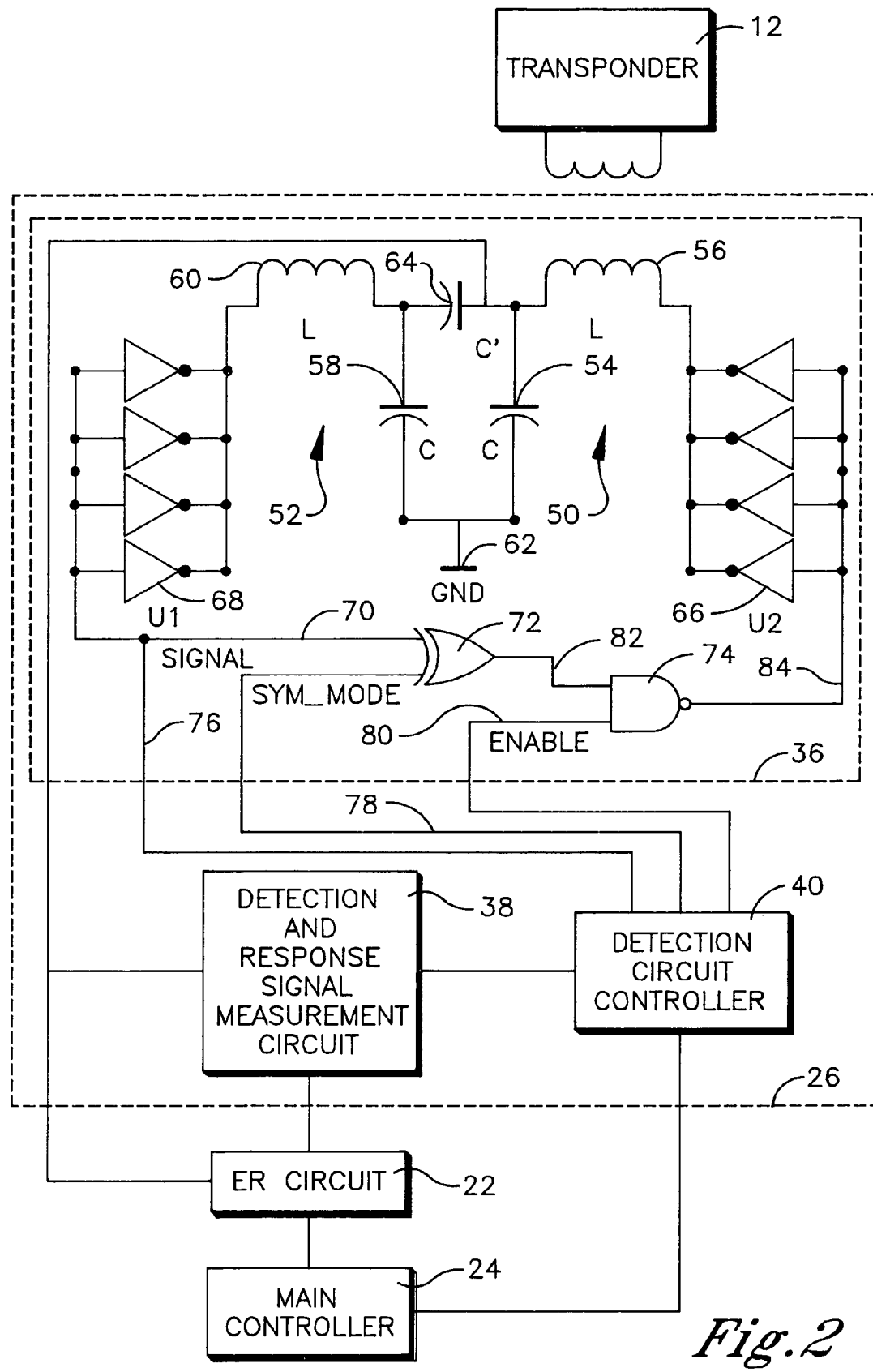
FIG. 2 is a schematic view of the detection signal generator circuit included within the RFID system and, more particularly, within the detection circuit of FIG. 1.

FIG. 2 shows a preferred embodiment of the detection signal generator circuit 36 in association with the detection and response signal measurement circuit 38, detection circuit controller 40, ER circuit 22 and main controller 24. The detection signal generator circuit 36 is a coupled oscillator system comprising a first LC pair 50 (alternately termed an oscillator) and a second LC pair 52. As such, the first LC pair 50 has a first tuning capacitor 54 and a first inductance coil 56 (alternately termed an inductor). The second LC pair 52 similarly has a second tuning capacitor 58 and a second inductance coil 60. Both first and second LC pairs 50, 52 are coupled to ground 62 and are coupled to one another across a coupling capacitor 64. The first LC pair 50 is provided with first CMOS drivers 66 and the second LC pair 52 is similarly provided with second CMOS drivers 68. The CMOS drivers 66, 68 are preferably embodied in one or more integrated circuit chips.

The detection signal generator circuit 36 is coupled to the detection circuit controller 40 across a signal/pulse node 70, a mode logic gate 72 (preferably an XOR gate), and an enable logic gate 74 (preferably a NAND gate), which are positioned in series. In particular, the detection circuit controller 40 is coupled to a SIGNAL/PULSE output line 76, a MODE output line 78, and an ENABLE output line 80. The SIGNAL and MODE output lines 76, 78 are the inputs to the XOR gate 72. The XOR gate 72 has an XOR output line 82, which along with the ENABLE output line 80, are the inputs to the NAND gate 74. The NAND gate 74 has a NAND output line 84 which provides an input pulse to the second CMOS drivers 68. The SIGNAL/PULSE output line 76 correspondingly provides an input pulse to the first CMOS drivers 66. The function of these pulses is described in greater detail below.

The detection signal generator circuit 36 enables the reader 14 to detect two or more of the transponders 12-1 through 12-N, each of which is tuned to a different resonant frequency and each of which correspondingly transmits a transponder data signal having a different carrier frequency, when the respective transponder is positioned within the read range of the reader 14. More particularly, the detection signal generator circuit 36 enables multiple transponder detection capabilities by generating multiple detection signals at different frequencies, while in the low power detection state. Still more particularly, the detection signal generator circuit 36 enables sequential generation of multiple detection signals by configuring the circuit 36 as a coupled oscillator system.

Coupled oscillator systems are characterized as having multiple "normal modes" of oscillation, alternately termed eigenfunctions, eigenvectors, and the like. In the ideal limit of a lossless system, oscillations resulting from the normal modes of a coupled oscillator system are orthogonal to one another. Furthermore, each normal mode of the coupled oscillator system defines a single frequency of oscillation, which is often unique to the respective normal mode. All possible oscillations of a coupled oscillator system are linear combinations of oscillations resulting from the normal modes of the system. The set of possible behaviors of a coupled oscillator system include linear combinations where only one normal mode of oscillation of the system is active. Activation of only a single normal mode is achieved by exciting the coupled oscillator system in accordance with proper initial conditions readily determined by the skilled artisan.

Oscillations resulting from the different normal modes of a coupled oscillator system do not exchange energy overtime due to their orthogonal character. Therefore, a coupled oscillator system starting with all its energy in one normal mode typically stays in that same normal mode for the duration of system operation absent any external influence. Accordingly, each normal mode of a coupled oscillator system can be separately initiated and discretely maintained by appropriate selection of the initial conditions. Appropriate selection of the initial conditions also permits selection of the particular frequency for a given normal mode as desired by the practitioner.

The detection signal generator circuit 36 shown and described herein is a particular type of coupled oscillator system termed a "double tuned" LC resonant circuit because the circuit 36 contains two LC pairs 50, 52. The detection signal generator circuit 36 has two distinct normal modes of oscillation, one normal mode is termed a symmetric mode of oscillation and the other normal mode is termed an anti-symmetric mode of oscillation. In accordance with the present preferred embodiment, the detection signal generator circuit 36 is a symmetrically configured circuit, wherein the respective inductors L of the LC pairs 50, 52 have values essentially equal to one another and the respective capacitors C of the LC pairs 50, 52 similarly have values essentially equal to one another. It is understood, however, that the present invention is not limited to symmetrically configured coupled oscillator systems, but alternately encompasses asymmetrically configured coupled oscillator systems which nevertheless have normal modes of oscillation.

Figure 3A:
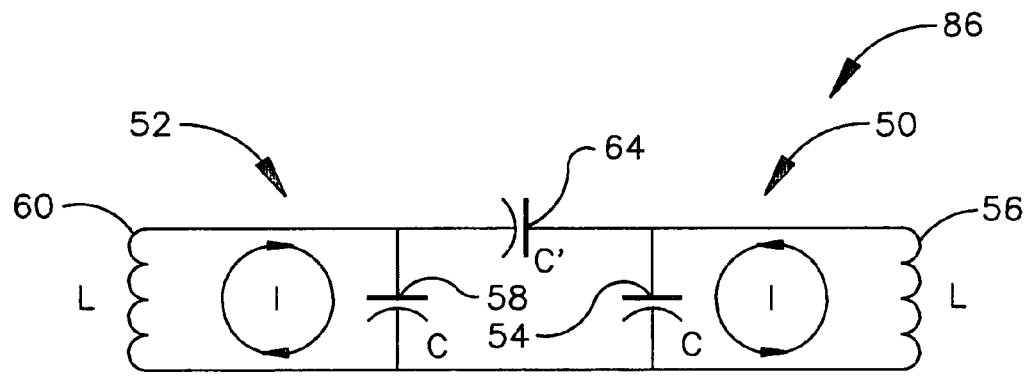
FIG. 3a is a conceptualized view of an idealized coupled oscillator system, which is conceptually representative of the detection signal generator circuit of FIG. 2, in the symmetric mode of oscillation.
Figure 3B:
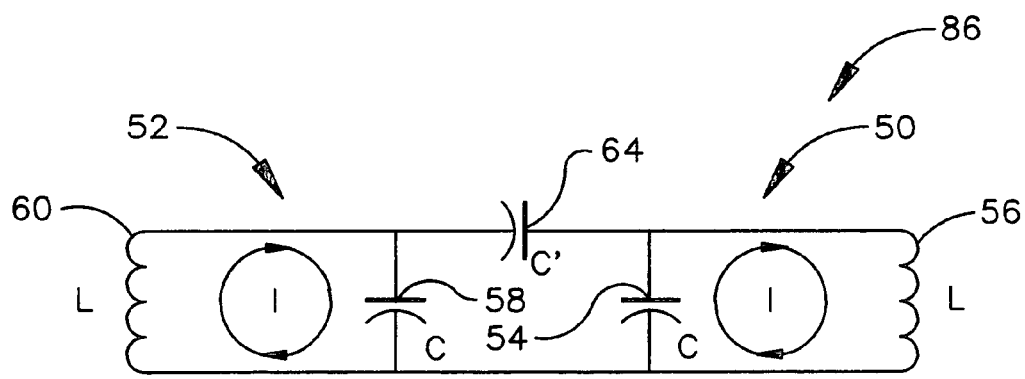
FIG. 3b is a conceptualized view of the coupled oscillator system of FIG. 3a in the anti-symmetric mode of oscillation.

Referring to FIGS. 3a and 3b, the topology for an idealized coupled oscillator system is shown, which is conceptually representative of the detection signal generator circuit 36 of FIG. 2. When the same reference characters are used in FIGS. 3a and 3b as FIG. 2, the like reference characters designate the same or similar elements. The idealized coupled oscillator system, which is generally designated 86, is shown operating in each of its two normal modes of oscillation, i.e., the symmetric mode of oscillation is shown in FIG. 3a and the anti-symmetric mode of oscillation is shown in FIG. 3b. The appropriate initial conditions for each mode of oscillation of the system 86 are achieved by simultaneously applying a combination of two pulses to two points on the system 86, wherein the combination of pulses is unique to the respective mode of oscillation. In particular, applying a symmetric combination of pulses achieves the symmetric mode of oscillation, while applying an anti-symmetric combination of pulses achieves the anti-symmetric mode of oscillation.

The oscillations resulting from the symmetric (S) mode shown FIG. 3a are characterized by equation (1) below:

$$2\pi f_S = 1/(LC)^{1/2} \tag{1}$$

The oscillations resulting from the anti-symmetric (A) mode shown in FIG. 3b are characterized by equation (2) below:

$$2\pi f_A = 1/(L(C+2C'))^{1/2} \tag{2}$$

Referring again to FIG. 2, in practice, operation of the reader 14 in the low power detection state, and specifically operation of the detection signal generator circuit 36, is initiated by setting an enable logic signal on the ENABLE output line 80 to high and conveying input pulses to the first and second CMOS drivers 66, 68 under the direction of the detection circuit controller 40. The input pulse to the first CMOS drivers 66 is the pulse on the NAND output line 84 and input pulse to the second CMOS drivers 68 is the pulse on the SIGNAL/PULSE output line 76. Each of the CMOS drivers 66, 68 simultaneously applies a square pulse to its associated LC pair 50, 52 in response to each input pulse it receives. Simultaneous application of the pulse to each LC pair 50, 52 causes both LC pairs 50, 52 to simultaneously resonate at a frequency which is a function of the applied pulse. Simultaneous resonance of the first and second LC pairs 50, 52 in response to a pulse on each LC pair generates a single ring signal (alternately termed a detection signal herein) because the first and second LC pairs 50, 52 are coupled across the coupling capacitor 64. Periodic application of multiple pulses simultaneously to each LC pair 50, 52 results in a sequence of detection signals, which are transmitted on the antenna assembly 20 into the surrounding space proximal to the reader 14.

The detection signal generator circuit 36 fixes the detection frequency of each detection signal by selectively setting the mode logic signal on the MODE output line 80. In particular, a detection frequency $f_S$, which is characteristic of the symmetric mode of oscillation, is achieved by setting the mode logic signal on the MODE output line 80 to low (i.e., the control level of the MODE output line 78 is logic 0). This setting causes the first CMOS drivers 66 to apply a pulse having a given drive sense to the first LC pair 50, while causing the second CMOS drivers 68 to simultaneously apply a pulse having the same drive sense to the second LC pair 50 (e.g., drive sense of both pulses is positive). A detection frequency $f_A$, which is characteristic of the anti-symmetric mode of oscillation, is achieved by setting the mode logic signal on the MODE output line 80 to high (i.e., the control level of the MODE output line 78 is logic 1). This setting causes the first CMOS drivers 66 to apply a pulse having a given drive sense to the first LC pair 50, while causing the second CMOS drivers 68 to simultaneously apply a pulse having an opposite drive sense to the second LC pair 50 (e.g., drive sense of one pulse is positive while the drive sense of the other pulse is negative).

Transmission of a detection signal into the proximal space of the reader 14 elicits a response signal on the reader antenna assembly 20, which has essentially the same detection frequency as the corresponding detection signal. All of the detection signals and resulting response signals are conveyed to the detection and response signal measurement circuit 38, which is coupled to the reader antenna assembly 20. The detection and response signal measurement circuit 38 evaluates these signals to determine whether a transponder 12 having a given transponder frequency is in the read range of the reader 14.

In accordance with the present embodiment of FIG. 2, the first inductance coil 56 of the first LC pair 50 functions as the reader antenna assembly 20 shown in FIG. 1. As such, the detection signals generated by the detection signal generator circuit 36 are transmitted on the first inductance coil 56 and the resulting response signals occur on the same coil 56. However, it is within the scope of the present invention for the second inductance coil 60 to alternatively function as the reader antenna assembly 20. In still other alternatives, both inductance coils 56, 60 can function as the reader antenna assembly 20 or neither can function as the reader antenna assembly 20. In the case where neither coil 56, 60 functions as the reader antenna assembly 20, a separate antenna coil (not shown) coupled to the detection circuit 26 is provided to transmit the detection signals and elicit the resulting response signals.

When a transponder 12 is detected in the read range of the reader 14, it is desirable to switch operation of the reader 14 to the high power data transaction state by configuring the detection signal generator circuit 36 so that the reader 14 can function in a conventional manner. The reader 14 is transitioned to the data transaction state by setting the enable logic signal on the ENABLE output line 80 to low. The signal on the SIGNAL/PULSE output line 76 is a digital signal generated by the ER circuit 22 in the form of a CW square wave carrier signal for simplex transponders or a modulated carrier signal for duplex transponders. In this configuration, the output signal from the first CMOS drivers 66 becomes a DC ground sink signal for the carrier signal on the first inductance coil 56 and the second LC pair 52 behaves as a low pass filter.

Low power operation of the detection signal generator circuit 36 is described above in a single mode of oscillation. However, the detection signal generator circuit 36 can also be operated at low power in mixed mode of oscillation. The enable logic signal on the ENABLE output line 80 is set to low in the same manner as high power operation, but a square pulse rather than a carrier signal is transmitted on the SIGNAL/PULSE output line 76 to achieve a mixed mode of oscillation.

The detection signal generator circuit 36 is described herein as having two coupled LC pairs 50, 52 only by way of example, and not by way of limitation. It is understood that the present invention embodies alternate detection signal generator circuits configured as coupled oscillator systems having three or more coupled LC pairs which enable detection of three or more of the transponders 12-1 through 12-N, each of which is tuned to a different resonant frequency. The construction and operation of such alternate detection signal generator circuits is readily within the purview of the skilled artisan applying the teaching disclosed herein. Such alternate detection signal generator circuits are set into a normal mode of oscillation using appropriate initial conditions selected by properly choosing the phase and/or amplitude of the pulses at various points in the circuit.

Figure 4A:
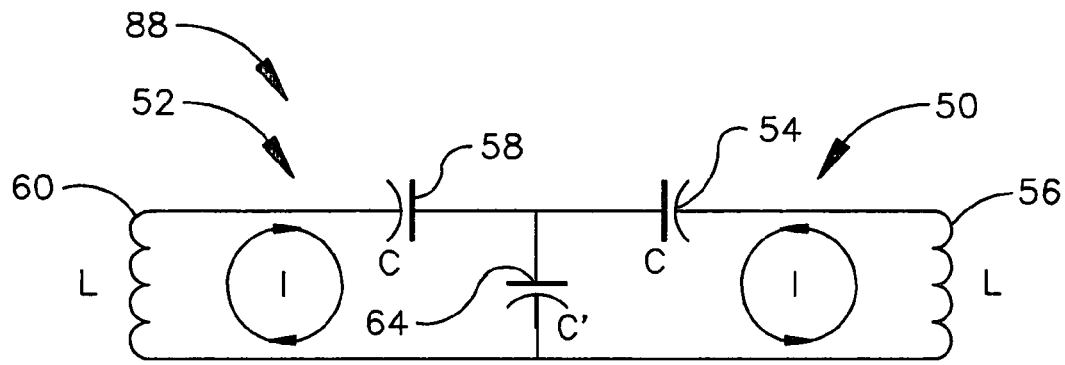
FIG. 4a is a conceptualized view of an alternate idealized coupled oscillator system in the symmetric mode of oscillation.
Figure 4B:
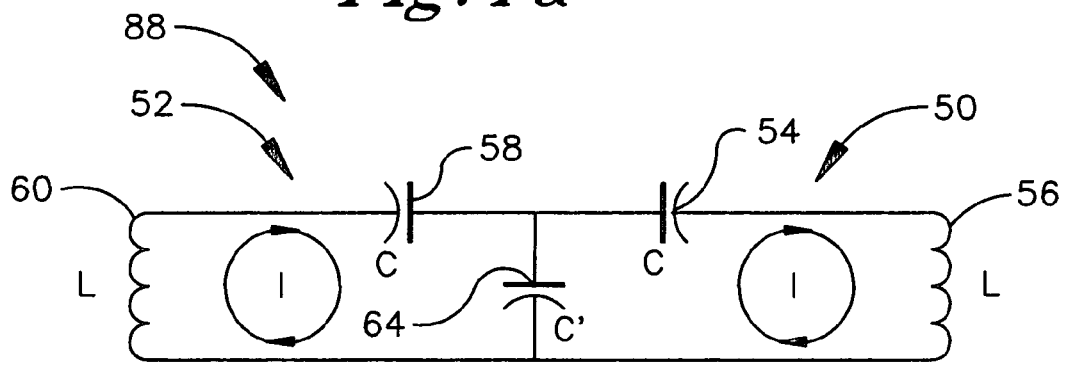
FIG. 4b is a conceptualized view of the coupled oscillator system of FIG. 4a in the anti-symmetric mode of oscillation.
Figure 5:
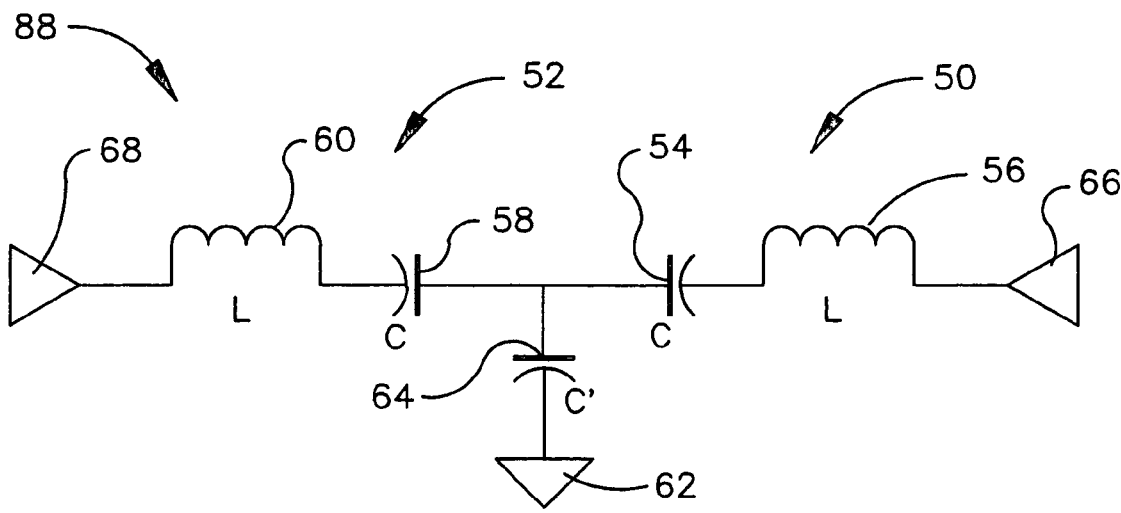
FIG. 5 is a conceptualized view of the coupled oscillator system of FIGS. 4a and 4b showing the system drivers.

It is further understood that the present invention embodies detection signal generator circuits having two coupled LC pairs in the manner of the circuit of FIG. 2, but having alternate topologies. For example, the topology for an alternate embodiment idealized coupled oscillator system having two coupled LC pairs is shown in FIGS. 4a and 4b and generally designated 88. When the same reference characters are used in FIGS. 4a and 4b as FIG. 2, the like reference characters designate the same or similar elements. The idealized coupled oscillator system 88 is shown operating in each of its two normal modes of oscillation, i.e., the symmetric mode of oscillation is shown in FIG. 4a and the anti-symmetric mode of oscillation is shown in FIG. 4b. FIG. 5 is a conceptualized representation of the idealized coupled oscillator system of FIGS. 4a and 4b which shows the drivers for the system. The logic to create pulses in the system 88 of FIGS. 4a, 4b and 5 is essentially the same as the logic of the detection signal generator circuit 36 of FIG. 2.

The present invention is further a method for processing a sequence of measurements of a predetermined detection parameter for the detection signals and response signals, wherein each detection and response signal either has the frequency associated with the symmetric mode of oscillation or the frequency associated with the anti-symmetric mode of oscillation. In accordance with the signal processing method, the detection signal generator circuit 36 of the reader 14 selectively generates a specific sequence of first and second detection signals while in the low power detection state, wherein the first detection signals have a first frequency associated with the symmetric mode and the second detection signals have a second frequency associated with the anti-symmetric mode. The detection signal generator circuit 36 applies the sequence of detection signals to the reader antenna assembly 20 which results in a corresponding sequence of response signals on the reader antenna assembly 20.

An exemplary sequence of detection signals generated by the detection signal generator circuit 36 is represented by a sequence of multiplexed measurements. The sequence of measurements appears as follows:

...S A S A S A S A S A S A S A S A S A S A...

"S" represents a measurement of the first detection signal having a shape characteristic of the case where no transponder 12 is residing in the surrounding space proximal to the reader 14. As described above, the first detection signal has the first frequency associated with the symmetric mode and is produced by simultaneously applying a symmetric combination of pulses to both LC pairs 50, 52 of the detection signal generator circuit 36. "A" similarly represents a measurement of the second detection signal having a shape characteristic of the case where no transponder 12 is residing in the surrounding space proximal to the reader 14. As described above, the second detection signal has the second frequency associated with the anti-symmetric mode and is produced by simultaneously applying an anti-symmetric combination of pulses to both LC pairs 50, 52 of the detection signal generator circuit 36.

Because the detection circuit controller 40 selects the pulse combinations for generating the detection signals, the reader firmware or hardware provides the reader 14, and more preferably the detection circuit controller 40, with means for demultiplexing and separately processing measurements, which are derived from the above-recited multiplexed sequence of measurements, as two subsequences of measurements, respectively. The two subsequences of measurements appear as follows:

...S S S S S S S S S S S S...

and

...A A A A A A A A A A A A...

The reader 14, and more preferably the detection circuit controller 40, is further provided with means for distinguishing between measurements of the detection signals and response signals. "s" represents a measurement of a first response signal which results from the case where a transponder 12, which is tuned at or near the first frequency $f_S$ associated with the symmetric mode of oscillation, is residing in the surrounding space proximal to the reader 14. "a" similarly represents a measurement of a second response signal which results from the case where a transponder 12, which is tuned at or near the second frequency $f_A$ associated with the anti-symmetric mode of oscillation, is residing in the surrounding space proximal to the reader 14. Thus, the reader 14, and more preferably the detection circuit controller 40, is provided with means to distinguish between measurements of "S" and "s" and between measurements of "A" and "a". An exemplary distinguishing means is a technique wherein measured values are compared to predetermined threshold levels. The reader 14 may still further be provided with means for applying digital or other filtering techniques to each subsequence of measurements so that the threshold level for each measurement subsequence can be slowly adjusted over time in response to drift caused by component aging or environmental factors unrelated to the presence of a transponder 12 proximal to the reader 14.

When a transponder 12, which has a resonant frequency nearer $f_S$ than $f_A$, is positioned proximal to the reader 14, the resulting sequence of measurements for the detection and response signals on the reader antenna assembly 20 appears as follows:

...S A S A S A S A s A s A s A s A s A s A...

Similarly, when a transponder 12, which has a resonant frequency nearer $f_A$ than $f_S$, is positioned proximal to the reader 14, the resulting sequence of measurements for the detection and response signals on the reader antenna assembly appears as follows:

...S A S A S A S A S a S a S a S a S a S a S a...

In either case, the reader 14 is able to detect a transponder 12 positioned within the proximal space of the reader 14 by detecting a change from "S" to "s" or from "A" to "a" within the appropriate subsequence of measurements. It is noted that if a transponder 12 is positioned close enough to the reader 14, the resulting coupling may enable both modes of response signals, in which case the reader 14 may detect the transponder 12 by detecting a change within either subsequence of measurements.

Once the reader 14, which is functioning in the low power detection state detects a transponder 12 in the above-described manner, the reader 14 switches to the high power detection state. The reader 14 automatically switches back to the low power detection state when the high power data transaction state is completed, awaiting the detection of another transponder 12.

The above-recited exemplary sequence of measurements for detection and response signals is termed an alternating sequence insofar as each measurement alternates between S (or s) and A (or a). It is apparent to the skilled artisan that any number of other types of sequences may be utilized within the scope of the present invention. For example, non-alternating, balanced sequences can be generated in accordance with the present invention, which are derived from non-alternating, balanced pulse rates (e.g., ... S S A A S S A A S S a a S S a a ... ). A non-alternating, balanced sequence is defined as a sequence of measurements, wherein the entire sequence is approximately equally distributed between S (or s) and A (or a), but each measurement of the sequence does not alternate between S (or s) and A (or a). Similarly non-alternating, unbalanced sequences can be generated in accordance with the present invention, which are derived from non-alternating, unbalanced pulse rates (e.g., ... S A S S S S A S A A A S a S S S S a S a a a ... ).

Figure 6:
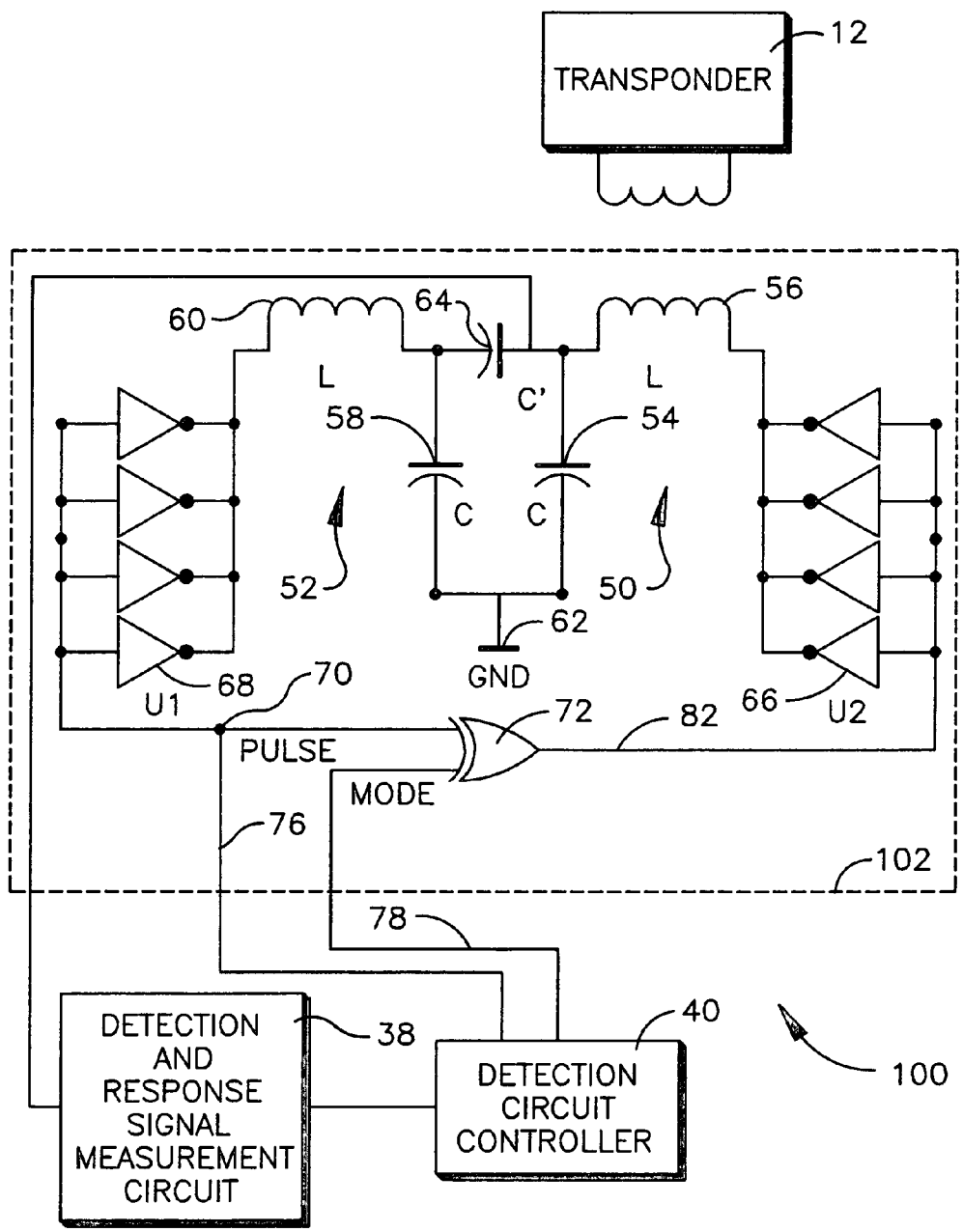
FIG. 6 is a schematic view of a stand-alone detection circuit of the present invention.

Referring to FIG. 6, an alternate construction of the detection circuit is shown and generally designated 100. The detection circuit 100 differs from the detection circuit 26 in that the detection circuit 100 is constructed to function as a standalone transponder detector apart from the reader 14. When the same reference characters are used in FIG. 6 as FIG. 2, the like reference characters designate the same or similar elements, which are common to both embodiments of the detection circuits 26 and 100 shown in FIGS. 2 and 6, respectively.

The detection circuit 100 comprises a detection signal generator circuit 102, the detection and response signal measurement circuit 38, and the detection circuit controller 40. The detection and response signal measurement circuit 38 and the detection circuit controller 40 are essentially the same as those of the detection circuit 26 and the detection signal generator circuit 102 is essentially the same as the detection signal generator circuit 36 except for exclusion of the NAND gate 74, ENABLE output line 80, and NAND output line 84 from the detection signal generator circuit 102. As such, the detection signal generator circuit 102 is a coupled oscillator system comprising the first and second LC pairs 50, 52. Both first and second LC pairs 50, 52 are coupled to ground 62 and are coupled to one another across the coupling capacitor 64. The first and second LC pairs 50, 52 are provided with the first and second CMOS drivers 66, 68, respectively.

The detection signal generator circuit 102 is coupled to the detection circuit controller 40 across the signal/pulse node 70 and XOR gate 72, which are positioned in series. In particular, the detection circuit controller 40 is coupled to the SIGNAL/PULSE output line 76 and the MODE output line 78. The SIGNAL/PULSE and MODE output lines 76, 78 are the inputs to the XOR gate 72. The XOR output line 82 provides the input pulse to the second CMOS drivers 68. The SIGNAL/PULSE output line 76 correspondingly provides the input pulse to the first CMOS drivers 66. The function of these signals is essentially the same as described above with respect to the detection signal generator circuit 36. Accordingly, the detection signal generator circuit 102 enables detection of two or more of the transponders 12-1 through 12-N, each of which is tuned to a different resonant frequency and each of which correspondingly transmits a transponder data signal having a different carrier frequency, when the respective transponders are positioned proximal to the circuit 102.

While the forgoing preferred embodiments of the invention have been described and shown, it is understood that alternatives and modifications, such as those suggested and others, may be made thereto and fall within the scope of the invention. For example, although the detection signal generator circuit and the detection and response signal measurement circuit are shown and described above as being separate from the ER circuit, it is within the purview of the skilled artisan to partially or entirely incorporate the detection signal generator and detection and response signal measurement circuits into the ER circuit. There is also the possibility of sharing certain specified components between the circuits. It is further within the purview of the skilled artisan to alternately integrate some or all of the functions and/or structure of the detection circuit controller into the main controller or vice versa. It is still further within the purview of the skilled artisan to integrate some or all of the functions and/or structure of the detection and response signal measurement circuit into the detection circuit controller. Such alternatives and modifications are within the scope and contemplation of the present invention.

We claim:

1. An RFID transponder detector comprising:
a first LC pair including a first inductance coil and a first tuning capacitor;
a second LC pair including a second inductance coil and a second tuning capacitor, wherein said first LC pair is coupled to said second LC pair;
an antenna coupled to said first and second LC pair;
a controller coupled to said first and second LC pairs for applying first pulses and second pulses to said first and second LC pairs, thereby resonating said first and second LC pairs to produce a sequence of first and second detection signals, wherein said first detection signal has a first detection frequency and said second detection signal has a second detection frequency different from said first detection frequency, further wherein transmitting said sequence of detection signals from said antenna results in corresponding first and second response signals having said first and second detection frequencies, respectively, on said antenna;
a detection and response signal measurement circuit coupled to said antenna and said controller for receiving said first and second detection signals and said corresponding first and second response signals and measuring values of a preselected detection parameter for each of said detection signals and each of said response signals, wherein said controller or detection and response signal measurement circuit is configured to compare said values for said detection signals to said values for said response signals and determine if a transponder having a transponder resonant frequency corresponding to said first or second detection frequency is present in a proximal space of said transponder detector based on comparison of said values; and a coupling capacitor, wherein said first LC pair is coupled to said second LC pair across said coupling capacitor.

2. The RFID transponder detector of claim 1 further comprising a first driver coupled between said first LC pair and said controller, wherein said controller applies said pulses to said first LC pair through said first driver.

3. The RFID transponder detector of claim 1 further comprising a second driver coupled between said second LC pair and said controller, wherein said controller applies said pulses to said second LC pair through said second driver.

4. The RFID transponder detector of claim 1 further comprising a mode switch in communication with said controller, said controller configured to direct transitioning of said mode switch between a first position and a second position, said first position determining a symmetric mode of oscillation of said first and second LC pairs and said second position determining an anti-symmetric mode of oscillation of said first and second LC pairs.

5. The RFID transponder detector of claim 4, wherein said mode switch is a mode logic gate.

6. The RFID transponder detector of claim 4 further comprising an enable switch in communication with said controller, said controller configured to direct transitioning of said enable switch between two positions, said two positions determining whether one of said detection signals or an excitation signal is applied on said antenna.

7. The RFID transponder detector of claim 6, wherein said enable switch is an enable logic gate.

8. The RFID transponder detector of claim 1, wherein said first and/or second inductance coil functions as said antenna.

9. The RFID transponder detector of claim 1 further comprising a third LC pair including a third inductance coil and a third tuning capacitor, wherein said third LC pair is coupled to said controller for applying third pulses to said third LC pair, thereby producing said sequence of detection signals transmitted by said antenna, wherein said sequence of detection signals includes detection signals having at least three different frequencies, thereby defining a third detection frequency in addition to said first and second detection frequencies, said detection and response signal measurement circuit coupled to said third LC pair for determining if a transponder having a transponder resonant frequency corresponding to said third detection frequency is present in said proximal space of said transponder detector.

10. A transponder detection method comprising:
applying first pulses to a first location and a second location on a coupled oscillator system having a first LC pair and a second LC pair;
resonating said first and second LC pairs in response to said first pulses to generate a first detection signal having a first detection frequency correlated to said first pulses;
applying second pulses to said first and second locations on said coupled oscillator system;
resonating said first and second LC pairs in response to said second pulses to generate a second detection signal having a second detection frequency different than said first detection frequency and correlated to said second pulses;
transmitting a sequence of said first and second detection signals into a space proximal to said first and second LC pairs;
producing first and second response signals corresponding to said first and second detection signals, respectively;
measuring values of a preselected detection parameter for said first detection signal, said second detection signal, said first response signal, and said second response signal to obtain a sequence of values of said detection parameter for said detection and response signals;
comparing said value for said first detection signal to said value for said first response signal;
comparing said value for said second detection signal to said value for said second response signal;
determining if a transponder having a first transponder resonant frequency corresponding to said first detection frequency is present in a proximal space of said transponder detector based on comparison of said values for said first detection and response signals; and
determining if a transponder having a second transponder resonant frequency corresponding to said second detection frequency is present in a proximal space of said transponder detector based on comparison of said values for said second detection and response signals.

11. A transponder detection method comprising:
applying first pulses to a first location and a second location on a coupled oscillator system having a first LC pair and a second LC pair;
resonating said first and second LC pairs in response to said first pulses to generate a first detection signal having a first detection frequency correlated to said first pulses;
applying second pulses to said first and second locations on said coupled oscillator system;
resonating said first and second LC pairs in response to said second pulses to generate a second detection signal having a second detection frequency different than said first detection frequency and correlated to said second pulses;
transmitting a sequence of said first and second detection signals into a space proximal to said first and second LC pairs;
producing first and second response signals corresponding to said first and second detection signals, respectively;
measuring values of a preselected detection parameter for said first detection signal, said second detection signal, said first response signal, and said second response signal to obtain a sequence of values of said detection parameter for said detection and response signals;
comparing said value for said first detection signal to said value for said first response signal;
comparing said value for said second detection signal to said value for said second response signal;
determining if a transponder having a first transponder resonant frequency corresponding to said first detection frequency is present in a proximal space of said transponder detector based on comparison of said values for said first detection and response signals;
determining if a transponder having a second transponder resonant frequency corresponding to said second detection frequency is present in a proximal space of said transponder detector based on comparison of said values for said second detection and response signals; and
separating said sequence of values into a subsequence of values for said first detection signals and a subsequence of values for said second detection signals before comparing said values for said second detection signals to said values for said second response signals.

12. The method of claim 10, wherein said detection parameter is signal voltage or signal decay rate.

13. The method of claim 10, wherein said first detection signal results from a symmetric mode of oscillation of said first and second LC pairs and said second detection signal results from an anti-symmetric mode of oscillation of said first and second LC pairs.

14. The method of claim 10, wherein said sequence of values is an alternating sequence.

15. The method of claim 10 further comprising,
applying third pulses to said first and second locations and to a third location on said coupled oscillator system having a third LC pair,
resonating said first, second and third LC pairs in response to said third pulses to generate a third detection signal having a third detection frequency correlated to said third pulses;
transmitting a sequence of said first, second and third detection signals into a space proximal to said first and second LC pairs;
producing a third response signal corresponding to said third detection signal,
measuring values of said detection parameter for said third detection and response signals,
comparing said value for said third detection signal to said value for said third response signal, and
determining if a transponder having a third transponder resonant frequency corresponding to said third detection frequency is present in a proximal space of said transponder detector based on comparison of said values for said third detection and response signals.

16. A reader for an RFID system comprising:
a detection circuit including,
a first LC pair including a first inductance coil and a first tuning capacitor,
a second LC pair including a second inductance coil and a second tuning capacitor,
wherein said first LC pair is coupled to said second LC pair,
an antenna coupled to said first and second LC pair;
a detection circuit controller coupled to said first and second LC pairs for applying first pulses and second pulses to said first and second LC pairs, thereby resonating said first and second LC pairs to produce a sequence of first and second detection signals, wherein said first detection signal has a first detection frequency and said second detection signal has a second detection frequency different from said first detection frequency, further wherein transmitting said sequence of detection signals from said antenna results in corresponding first and second response signals having said first and second detection frequencies, respectively, on said antenna,
an enable switch in communication with said detection circuit controller, said detection circuit controller configured to direct transitioning of said enable switch between two positions, said two positions determining whether one of said detection signals or an excitation signal is applied on said antenna,
a mode switch in communication with said detection circuit controller, said detection circuit controller configured to direct transitioning of said mode switch between a first position and a second position, said first position determining a symmetric mode of oscillation of said first and second LC pairs and said second position determining an anti-symmetric mode of oscillation of said first and second LC pairs, and
a detection and response signal measurement circuit coupled to said antenna and said detection circuit controller for receiving said first and second detection signals and said corresponding first and second response signals and measuring values of a preselected detection parameter for each of said detection signals and each of said response signals, wherein said detection circuit controller or detection and response signal measurement circuit is configured to compare said values for said detection signals to said values for said response signals and determine if a transponder having a transponder resonant frequency corresponding to said first or second detection frequency is present in a proximal space of said transponder detector based on comparison of said values;
an exciter/reader circuit coupled to said antenna; and
a main controller coupled to said exciter/reader circuit and said detection circuit and configured to activate said exciter/reader circuit in response to a transponder recognized signal from said detection circuit controller.

17. The reader of claim 16, wherein said reader antenna is integral with said first and/or second inductance coils.

18. The reader of claim 16, wherein said main controller is integral with said detection circuit controller.

19. An RFID transponder detector comprising:
a first LC pair including a first inductance coil and a first tuning capacitor;
a second LC pair including a second inductance coil and a second tuning capacitor, wherein said first LC pair is coupled to said second LC pair;
an antenna coupled to said first and second LC pair;
a controller coupled to said first and second LC pairs for applying first pulses and second pulses to said first and second LC pairs, thereby resonating said first and second LC pairs to produce a sequence of first and second detection signals, wherein said first detection signal has a first detection frequency and said second detection signal has a second detection frequency different from said first detection frequency, further wherein transmitting said sequence of detection signals from said antenna results in corresponding first and second response signals having said first and second detection frequencies, respectively, on said antenna;
a detection and response signal measurement circuit coupled to said antenna and said controller for receiving said first and second detection signals and said corresponding first and second response signals and measuring values of a preselected detection parameter for each of said detection signals and each of said response signals, wherein said controller or detection and response signal measurement circuit is configured to compare said values for said detection signals to said values for said response signals and determine if a transponder having a transponder resonant frequency corresponding to said first or second detection frequency is present in a proximal space of said transponder detector based on comparison of said values; and
a mode switch in communication with said controller, said controller configured to direct transitioning of said mode switch between a first position and a second position, said first position determining a symmetric mode of oscillation of said first and second LC pairs and said second position determining an anti-symmetric mode of oscillation of said first and second LC pairs.

20. The method of claim 10 further comprising separating said sequence of values into a subsequence of values for said first detection signals and a subsequence of values for said second detection signals before comparing said values for said first detection signals to said values for said first response signals.

* * * * *